United States Patent [19]

Tsuchiya et al.

[11] Patent Number: 4,608,540
[45] Date of Patent: Aug. 26, 1986

[54] PHASE-SHIFT KEYING DEMODULATOR

[75] Inventors: Masahiro Tsuchiya; Masaharu Mori, both of Tokyo, Japan

[73] Assignee: Clarion Co., Ltd., Tokyo, Japan

[21] Appl. No.: 624,638

[22] Filed: Jun. 26, 1984

[30] Foreign Application Priority Data

Jul. 4, 1983 [JP] Japan ............................ 58-122171
Jul. 4, 1983 [JP] Japan ............................ 58-122172

[51] Int. Cl.⁴ .............................................. H03K 9/06
[52] U.S. Cl. .................................... 329/107; 329/110; 329/122; 329/126; 375/56; 375/84
[58] Field of Search ................. 329/50, 107, 110, 122, 329/124, 126; 375/52, 56, 83, 84, 94

[56] References Cited

U.S. PATENT DOCUMENTS

3,993,956 11/1976 Gilmore et al. ........................ 375/84
4,348,641 9/1982 Scott et al. ............................. 329/50
4,470,147 9/1984 Goatcher .......................... 329/50 X
4,521,892 1/1985 Vance et al. .................... 329/124 X Primary Examiner—Eugene R. LaRoche
Assistant Examiner—J. C. Lee
Attorney, Agent, or Firm—Flynn, Thiel, Boutell & Tanis

[57] ABSTRACT

A PSK demodulator demodulate a PSK signal into a digital data, which PSK signal is an encoded signal comprising a carrier phase shifted by a digital signal data. The PSK demodulator comprises: a reference signal oscillator; first multiplier which multiplies the PSK signal and first reference signal supplied from the reference signal oscillator and having the same frequency as that of the carrier, and provides first low pass component as a carrier phase data as the result of the multiplication; second multiplier which multiplies the PSK signal and second reference signal supplied from the reference signal oscillator and having 90 degrees phase difference from the first reference signal, and provides second low pass component as another carrier phase data as the result of the multiplication; analog-to-digital converters which convert the first and second low pass components to digital signals; memories which store the digital signals from the analog-to-digital converters for a time corresponding to one symbol; and a discriminator which compares each digital signal with the one symbol preceding digital signal stored in the memories and discriminates whether the phase difference between the two digital signals is $\theta$ or $\theta \pm 180°$.

4 Claims, 11 Drawing Figures

PHASE-SHIFT KEYING DEMODULATOR

FIELD OF THE INVENTION

This invention relates to a phase-shift keying (PSK) demodulator for demodulating signals modulated by a so called PSK system including a DPSK system, which modulates the phase of a carrier with a data comprising a digital signal.

BACKGROUND OF THE INVENTION

Differentialy coherent phase-shift keying (DPSK) is sometimes employed as one form of PSK modulation system, and is herewith taken as an example for better understanding of the invention.

There is often used a delay detection system to demodulate DPSK modulated signals. In this system, DPSK demodulation is effected by multiplying a nondelayed signal and a delayed signal by a time corresponding to one symbol. This system requires a considerably accurate phase coincidence between carriers of the both input signals. Due to this, an accurate and stable delay line or other corresponding means must be used. However, it is extremely difficult to fabricate delay lines with an accurate desired delay time and not liable to changes in characteristics with temperature and time.

Figure 1:
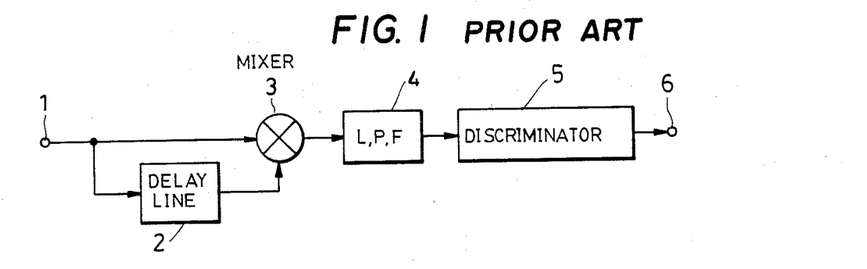
FIG. 1 is a block diagram which shows a prior art construction of a DPSK demodulator of a delay detection type.
Figure 2:
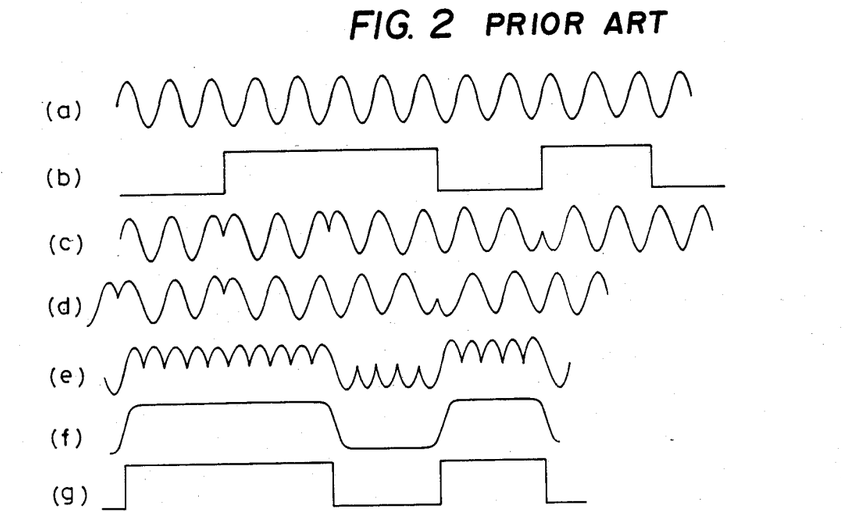
FIG. 2 shows proper waveforms (a) through (g) of input and output signals at various positions of the system of FIG. 1 when the system properly operates.
Figure 3:
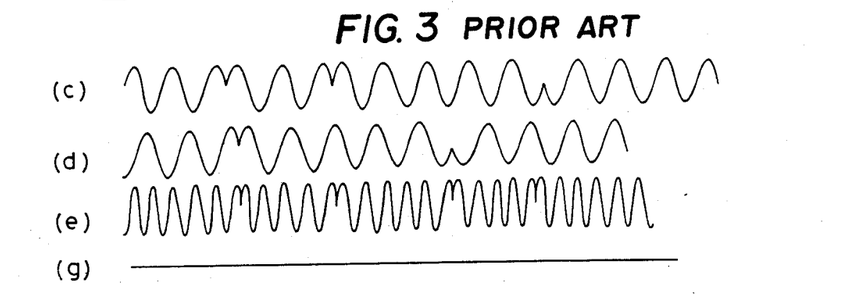
FIG. 3 shows improper waveforms (c) through (g) corresponding to the waveforms (c) through (g) of FIG. 2 when a delay time of delay line is not proper.

FIG. 1 is a block diagram showing a general construction of a DPSK demodulator of a delay detection type. Reference numeral 1 refers to a DPSK signal input terminal, 2 refers to a one-symbol delay line, 3 refers to a mixer, 4 refers to a low pass filter, 5 refers to a discriminator and 6 refers to an output terminal. FIG. 2 shows various signal waveforms. FIG. 2a shows the waveform of a carrier, FIG. 2b is of a data, FIG. 2c is of a signal obtained by two phases DPSK demodulation from the waveforms of FIGS. 2a and 2b and applied to the DPSK signal input terminal of FIG. 1. Namely, the two phases DPSK signal of FIG. 2c is obtained by inverting the carrier phase of FIG. 2a if the data phase is 1 and maintaining the original carrier phase if the data phase is 0. FIG. 2d is the waveform of an output from the one symbol delay line 2 of FIG. 1. FIG. 2e is the waveform of an output from the mixer 3, and FIG. 2f is the waveform of an output from the low pass filter 4. FIG. 2g is the waveform of a data demodulated by use of a signal which is discriminated by the discriminator 5 of FIG. 1. In brief, the data is demodulated by obtaining the product between the non-delayed DPSK signal applied to the system of FIG. 1 and the one symbol delayed signal therefrom. The proper data demodulation, however, cannot be expected as shown in FIGS. 3c, 3d, 3e and 3g unless the delay time of the delay line 2 is accurate. FIGS. 3c, 3d, 3e and 3g show waveforms corresponding to but deviated from those of FIGS. 2c, 2d, 2e and 2g, respectively. If the carrier frequency is high, the phase difference between the carriers of the non-delayed and delayed signals applied to the mixer 3 becomes large with a slight error of the delay time, thereby demodulating an improper data. Therefore, a high frequency of a carrier, in particular, requires an accurate and stable delay time.

Figure 4:
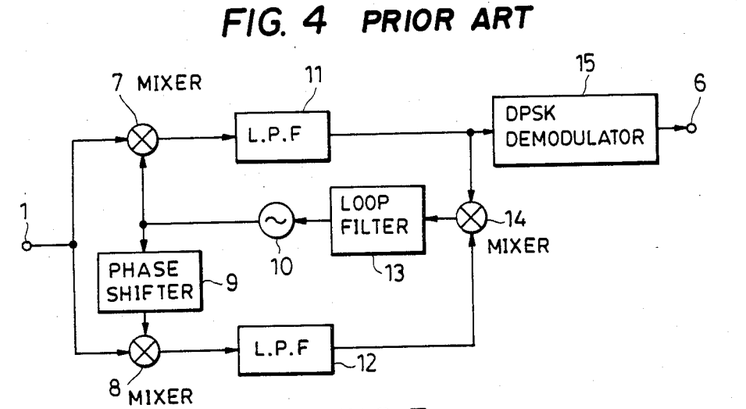
FIG. 4 is a block diagram showing a prior art construction of DPSK demodulator including a Costas loop.

To overcome this problem of carrier phases, there is proposed a system which removes the carrier components before such DPSK demodulation and thereafter demodulates the data by a baseband transmission system, as shown in FIG. 4. In the Figure, reference numerals 7, 8 and 14 refer to mixers, 9 refers to a 90° phase shifter, 10 refers to a voltage control oscillator, 11 and 12 refer to low pass filters, 13 refers to a loop filter, and 15 refers to a DPSK demodulator. The circuit illustrated includes a well known Costas loop. The Costas loop demodulates the two phases modulated signal, and the DPSK demodulator 15 demodulates the output (baseband) from the loop. The system of FIG. 4, however, includes the closed loop which requires synchronization between the phases of the carrier and of the reference signal (output from the voltage control oscillator 10). As is widely acknowledged, such a phase synchronization is not so easy.

OBJECT OF THE INVENTION

It is therefore an object of the invention to provide a PSK demodulator which does not require phase synchronization between a carrier and a reference signal.

SUMMARY OF THE INVENTION

In accordance with the invention, there is provided a PSK (phase-shift keying) demodulator which comprises:

an input terminal to which a PSK signal encoded by modulating the phase of a carrier with a digital signal is applied;

first reference signal oscillation means for generating first reference signal with the same frequency as that of said carrier;

second reference signal oscillation means for generating second reference signal with 90 degrees phase difference from said first reference signal;

first multiplication means for multiplying said PSK signal and said first reference signal;

second multiplication means for multiplying said PSK signal and said second reference signal;

first phase data extracting means for extracting first low pass component from the multiplication output from said first multiplication means, said first low pass component representing carrier phase data;

second phase data extracting means for extracting second low pass component from the multiplication output from said second multiplication means, said second low pass component representing carrier phase data; and decoding means for demodulating said digital signal from said first and second low pass components.

The invention will be better understood from the description below made by way of preferred embodiments illustrated in the drawings.

DETAILED DESCRIPTION OF THE INVENTION

Figure 5:
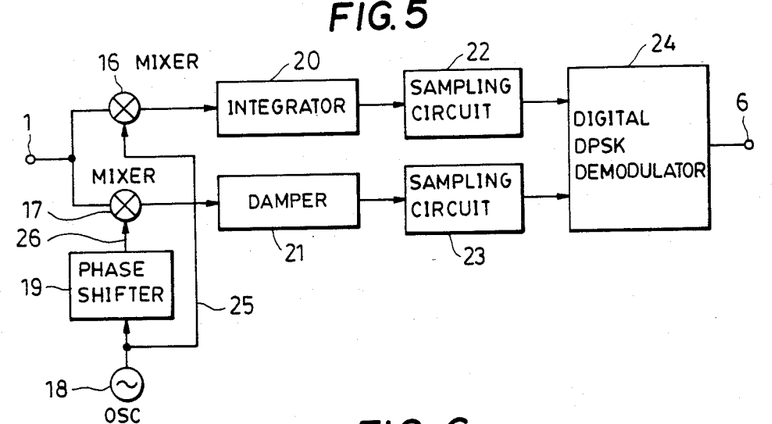
FIG. 5 is a block diagram showing a construction of a DPSK demodulator embodying the invention.

FIG. 5 is a block diagram which generally shows a DPSK demoduclator embodying the invention. Reference numerals 16 and 17 refer to mixers, 18 refers to a reference oscillator, 19 refers to a 90° phase shifter, 20 refers to an integrator, 21 refers to a damper, 22 and 23 refer to sampling circuits, and 24 refers to a digital DPSK demodulator.

A PSK signal, namely DPSK signal, for example, which is entered into the input terminal 1 is applied to one input of each of the mixers (multipliers) 16 and 17. The reference oscillator 18 applies a first reference signal to a phase shifter 19 and to the other input of the mixer 16 via a circuit line 25. The phase shifter 19 produces a second reference signal with 90° phase difference from the first reference signal, and applies it to the other input of the mixer 17 via a circuit line 26. Multiplication outputs from the mixer 16 and 17 are applied to the sampling circuits 22 and 23 via the integrator 20 and the damper 21, respectively.

The theory of the invention will be hereunder explained by way of how to demodulate a signal modulated by two phases DPSK system, referring to FIG. 5.

Figure 6:
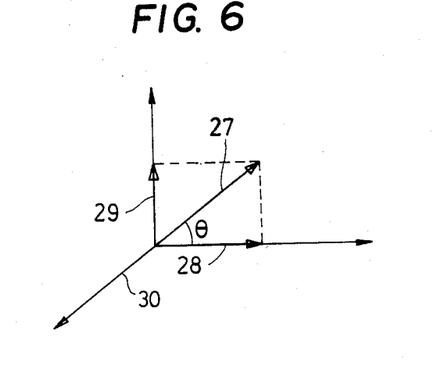
FIG. 6 is a diagram showing vectors of an input signal and of component forces thereof.

Two phases DPSK modulation provides two signals different in phase. If one signal has $\theta°$ phase difference from the first reference signal, the other signal has $\theta$ phase difference from the first reference signal, the other signal has $\theta+180°$ (or $\theta-180°$) phase difference. In demodulation of a DPSK signal, the pre-modulation digital data is demodulated to "0" if the phase difference of the preceding or suceeding symbol is $\theta°$, and is demodulated to "1" if the phase difference of the preceding or suceeding symbol is $\theta+180°$ (or $\theta-180°$). The phase difference $\theta$ between the input DPSK signal and the first reference signal is detected by first and second reference signals intersecting each other which are supplied from the reference oscillator 18. FIG. 6 shows this theory. In FIG. 6, the abscissa represents the vector direction of the first reference signal which is supplied via the circuit line 25, whereas the ordinate represents the vector direction of the second reference signal which is supplied via the circuit line 26. The vector 27 which shows the input DPSK signal may be divided into component forces 28 and 29 which have the same vector directions of the first and second reference signals, respectively. When the input DPSK signals are applied to the sampling circuits as described above, the sampling circuits produce first and second low pass component signals which have the same vector directions as the two intersecting reference signals, and apply them to the digital type DPSK demodulator 24. The two divided signal components supplied from the sampling circuits are applied to the demodulator 24 as phase-different data of the carriers demodulated by the digital data, and are demodulated therein by DPSK system.

Figure 7:
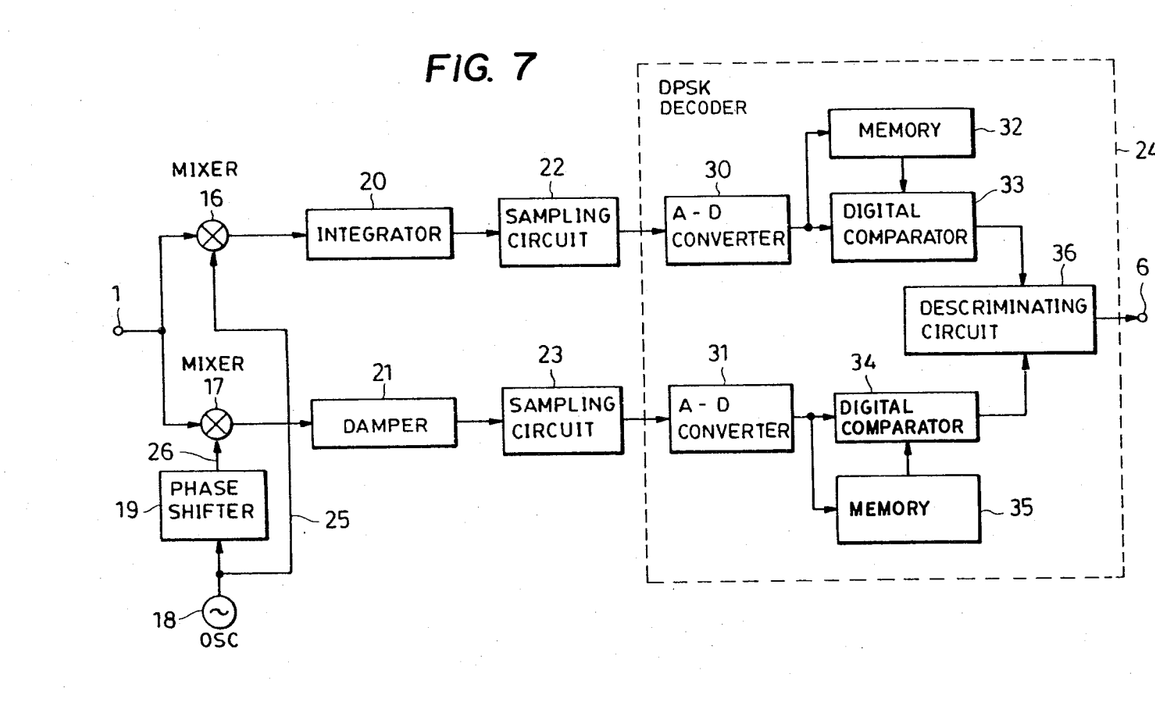
FIG. 7 is a block diagram showing the DPSK demodulator of FIG. 5 more specifically.

FIG. 7 is a block diagram which corresponds to FIG. 5 but details a construction of the digital type DPSK demodulator 24. The signals supplied from the sampling circuits 22 and 23 and representing the two phase-different data are applied first to A/D converters 30 and 31 and are converted from analog to digital. The digitized signals are compared by digital comparators 33 and 34 with the phase-different data of the precedent symbol which are stored in and supplied from memories 32 and 35. The outputs from the A/D converters 30 and 31 are stored in the memories 32 and 35 concurrently with or after the comparison by the digital comparators 33 and 34 so as to be sequently compared with the data of the suceeding symbol having another phase. A discriminator 36 discriminates the outputs from the digital comparators 33 and 34, and produces a DPSK demodulated data.

Figure 8:
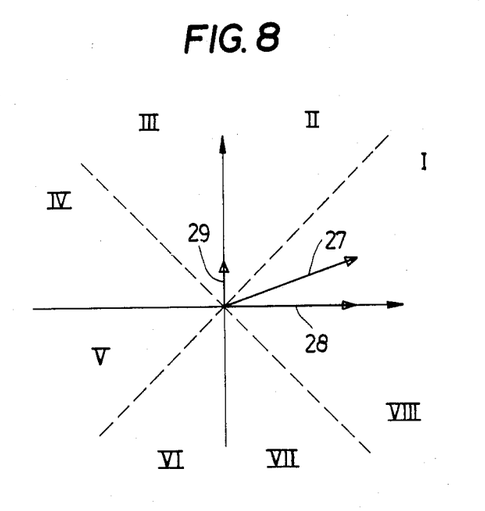
FIG. 8 shows the relation between phase sectioning and an input DPSK signal in the DPSK demodulator according to the invention.
Figure 9:
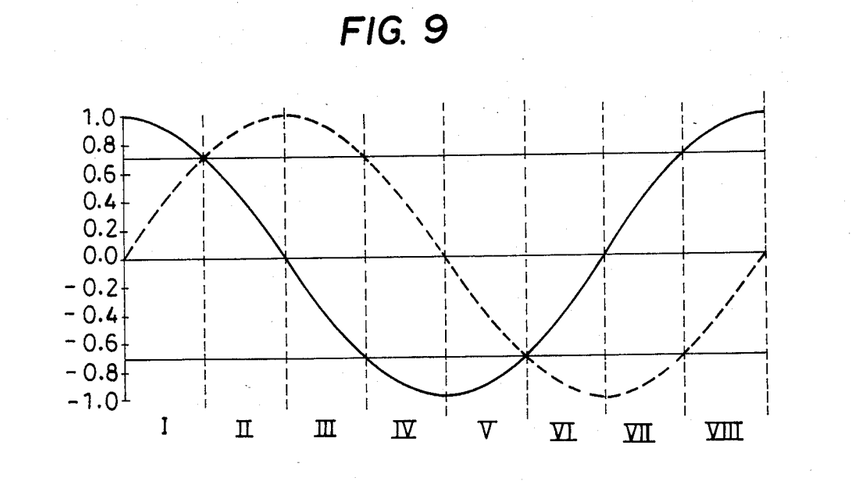
FIG. 9 is a diagram for additional explanation of the phase sectioning of FIG. 8.

In the embodiment of FIG. 7 employing two phases demodulation, if one of the phases is $\theta°$, the other is $\theta \pm 180°$ and cannot be otherwise. In four phases DPSK demodulation, if one of the phases is $\theta°$, the others are $\theta \pm 90°$ or $\pm 180°$ and cannot be otherwise. Therefore, discrimination of the phase differences does not require accurate or strict references. More specifically, one cycle from zero to 360° is divided into some sections, and phase differences are discriminated by detecting to which section a phase difference in problem belongs. This will be explained with the example of FIG. 8. As illustrated, one cycle from 0° to 360° is divided into eight sections I through VIII, and the input DPSK signal is in Section I. In the two phases DPSK demodulation, the other phase is in Section V. In the four phases DPSK demodulation, the other phases are in Sections III, V or VII. So, only requirement is to detect a section to which the input DPSK signal belongs. More specifically, there are eight sections each having 45° in FIG. 8. Such a sectioning is effected by providing thresholds at $\pm 1\sqrt{2}$ and 0 positions of the standardized amplitude of the outputs from the sampling circuits 22 and 23. In FIG. 9, the solid line curve represents cos $\theta$, the dash line curve represents sin $\theta$, and the solid straight line represents thresholds of $\pm 1\sqrt{2}$ and 0.

The individual divided sections are assigned their own digital numbers, so that the demodulator discriminates from the phase-different data cos $\theta$ and sin $\theta$ whichever section the input DPSK signal belongs to, and produces an output comprising a digital number which represents the discriminated section. For example, the sections of FIG. 9 are provided with digital numbers "000" to "111", starting from Section I and in order. Since the input DPSK signal is in Section I, the demodulator produces an output of "000". Thus, the sequential data processing is done digitally.

In the aforegoing description, the sectioning is such that the first and second reference signals make a system of orthogonal coordinates, and several (four, in FIG. 8) straight lines passing the origin divide the entire angle 360° into sections, so that one section is defined by adjacent two lines starting from the origin. Thus, the section where the input signal vector exists is judged to be the section where the carrier phase exists.

The aforedescribed feature of the invention is very effective for demodulation of DPSK modulated signals. Demodulation of DPSK modulated signals is carried out by comparison with the phase of a precedent symbol of the carrier.

While analog comparison requires an accurate delay line, the present invention does not, because the digital memory stores data for a time corresponding to one symbol. Namely, as described above, the input DPSK signal is compared with the first reference signal, the phase difference therebetween is detected and represented by a digital number, and is stored in the memory. The phase of the data supplied one symbol later also represented by a digital number and compared with the preceding digital number stored in the memory. Thus, the signal demodulation is effected. In the two phases DPSK modulation, two different phases take the positions in two symmetric sections with respect to the origin. Therefore, the data is demodulated into "0", for example, if the detected section is same as that detected one symbol before, whereas it is demodulated into "1" if the detected section is symmetrical to one symbol antecedent section. Demodulation into "0" and "1" may be vice versa. Further, if the detected section is neither same as nor symmetrical to the one symbol preceding section, it is acknowledged that an error has occurred.

Figure 10:
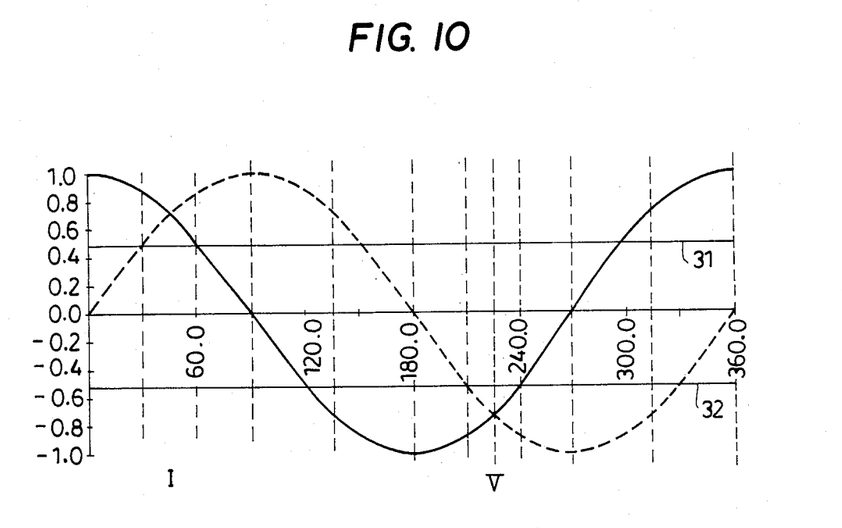
FIG. 10 is a diagram showing a relation between phase differences and outputs from sampling circuits.

FIG. 10 shows another system for sectioning one cycle from 0° to 360° by providing a positive threshold 31 and a negative threshold 32. In Section I, for example, the outputs from the sampling circuits 22 and 23 are larger than the positive threshold, and the phase difference $\theta$ is between 30° and 60°, approximately. The other phase must be in Section V, accordingly. To assign digital numbers to the sections, the following system may be employed. Namely, a digital number consisting of 4 bits is assigned to each section. One of the bits defines whether the output (cos $\theta$) from the sampling circuit 22 is larger than the positive threshold or not, another bit defines whether the same output is larger than the negative threshold or not, third bit defines whether the output (sin $\theta$) from the sampling circuit 23 is larger than the positive threshold or not, and the last bit defines whether the same output is larger than the negative threshold or not. For example, "1" is assigned to "larger than the positive threshold or smaller than the negative threshold", whereas "0" is assigned to "smaller than the positive threshold and larger than the negative threshold". Thus, Section I where cos $\theta$ is larger than the positive threshold (defined by "1") and larger than the negative threshold (defined by "0"), and sin $\theta$ is larger than the positive threshold (defined by "1") and larger than the negative threshold (defined by "0") is represented by digital number "1010".

Figure 11:
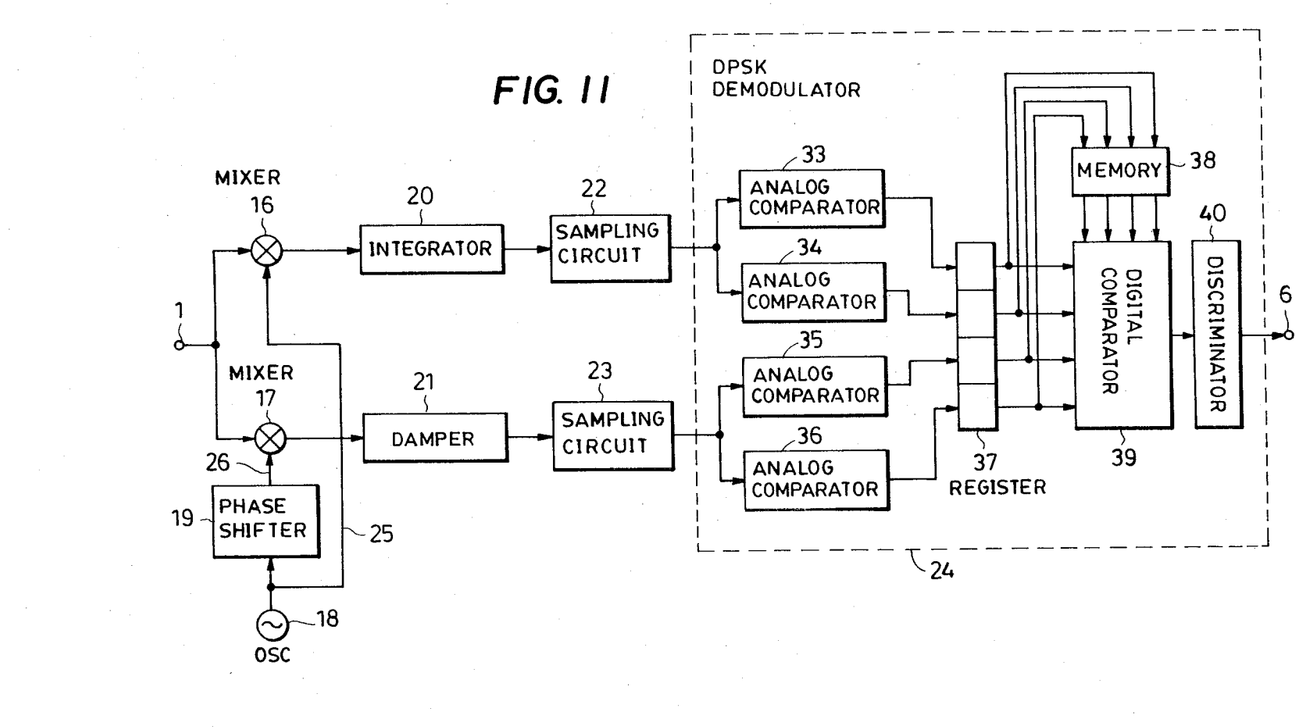
FIG. 11 is a block diagram showing a modified construction of the DPSK demodulator 24 in the system of the invention.

FIG. 11 shows a construction of a DPSK demodulator which employs the above-described sectioning system.

The sampling circuits 22 and 23 produce cos $\theta$ and sin $\theta$ signals, respectively. The output from the sampling circuit 22 is compared with the positive and negative thresholds in comparators 33 and 34, and the results are applied to a register 37. Similarly, the output from the sampling circuit 23 is compared with the thresholds in comparators 35 and 36, and the results are applied to the register 37. Each output from the register 37 is divided into two components. One of the components is applied to a digital comparator 39 and is compared therein with the preceding data stored in a memory 38. The other component is applied to the memory 38 and is used for comparison with the data of the succeeding symbol. The resulting output from the digital comparator 39 is applied to a discriminator 40 and is demodulated by DPSK system.

Although the aforegiven description refers to DPSK system, it will be clear to a skilled in the art that the present invention be applied to signals encoded by any other PSK system.

As described above, whilst the prior art system of PSK modulated signals requires an accurate and strict synchronization, the system according to the invention digitally effects signal discrimination by producing "0" or "1" depending upon whether a detected phase is $\theta°$ or $\theta \pm 180°$, thus eliminating the synchronization requirement and avoiding various drawbacks which might be brought by delay lines.

The embodiments of the invention in which an exclusive property or privilege is claimed are defined as follows:

1. A PSK (phase-shift keying) demodulator which comprises:
   an input terminal to which a PSK signal encoded by modulating the phase of a carrier with a digital signal is applied;
   first reference signal oscillation means for generating a first reference signal having the same frequency as said carrier;
   second reference signal oscillation means for generating a second reference signal having a 90 degree phase difference from said first reference signal;
   first multiplication means for multiplying said PSK signal and said first reference signal;
   second multiplication means for multiplying said PSK signal and said second reference signal;
   first phase data extracting means for extracting a first low pass component from the multiplication output from said first multiplication means, said first low pass component representing carrier phase data;
   second phase data extracting means for extracting a second low pass component from the multiplication output from said second multiplication means, said second low pass component representing carrier phase data; and
   decoding means for demodulating said digital signal from said first and second low pass components, said decoding means including: A/D conversion means for converting each of said first and second low pass components from an analog to a digital signal; memory means for storing each said digital signal from said A/D conversion means for a time corresponding to one symbol; and discrimination means for comparing a digital signal supplied from said A/D conversion means one symbol later with a respective said digital signal stored in said memory means and discriminating whether said compared digital signals each have the same phase difference $\theta$ or have respective phase differences of $\theta$ and $\theta \pm 180°$.

2. A PSK demodulator as claimed in claim 1, wherein said decoding means includes means for discriminating from said first and second low pass components in which one of plural sections the phase of said PSK signal belongs, said sections being plural equal divisions of one cycle from 0° to 360°.

3. A PSK (phase-shift keying) demodulator which comprises:
   an input terminal to which a PSK signal encoded by modulating the phase of a carrier with a digital signal is applied;

first reference signal oscillation means for generating a first reference signal having the same frequency as said carrier;
second reference signal oscillation means for generating a second reference signal having a 90 degree phase difference from said first reference signal;
first multiplication means for multiplying said PSK signal and said first reference signal;
second multiplication means for multiplying said PSK signal and said second reference signal;
first phase data extracting means for extracting a first low pass component from the multiplication output from said first multiplication means, said first low pass component representing carrier phase data;
second phase data extracting means for extracting a second low pass component from the multiplication output from said second multiplication means, said second low pass component representing carrier phase data; and
decoding means for demodulating said digital signal from said first and second low pass components, said decoding means including: analog comparator means for comparing individual positive and negative amplitudes of said first and second low pass components with positive and negative thresholds; storing means for storing the comparison output from said analog comparator means; memory means for storing said comparison output supplied from said storing means for a time corresponding to one symbol; digital comparator means for comparing said comparison output from said storing means with a prior said comparison output stored in said memory means; and discriminator means for demodulating said digital signal from the output from said digital comparator means.

4. A PSK demodulator as claimed in claim 3, wherein said analog comparator means which discriminates whether individual positive and negative amplitudes of said first and second low pass components are larger or smaller than positive and negative thresholds includes means for assigning a one bit digital number to each discrimination result, the comparison output from said analog comparator means including said one bit digital numbers.

* * * * *